US012619192B2

(12) United States Patent
Itabashi

(10) Patent No.: US 12,619,192 B2
(45) Date of Patent: May 5, 2026

(54) IMAGE FORMING APPARATUS INCLUDING MOVABLE DRAWER HAVING GUIDE SURFACE FOR GUIDING ATTACHMENT OF PROCESS CARTRIDGE

(71) Applicant: BROTHER KOGYO KABUSHIKI KAISHA, Nagoya (JP)

(72) Inventor: Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/980,170

(22) Filed: Dec. 13, 2024

(65) Prior Publication Data

US 2025/0110447 A1 Apr. 3, 2025

Related U.S. Application Data

(63) Continuation of application No. 18/474,818, filed on Sep. 26, 2023, now Pat. No. 12,210,314.

(30) Foreign Application Priority Data

Sep. 28, 2022 (JP) ................................ 2022-154427

(51) Int. Cl.
*G03G 21/16* (2006.01)
*G03G 21/18* (2006.01)

(52) U.S. Cl.
CPC ................................ *G03G 21/1842* (2013.01)

(58) Field of Classification Search
CPC ........... G03G 15/0907; G03G 15/0935; G03G 15/16; G03G 15/326; G03G 21/1842; G03G 21/203
USPC .......................................... 399/107, 110, 111
See application file for complete search history.

(56) References Cited

U.S. PATENT DOCUMENTS

| | | | | |
|---|---|---|---|---|
| 9,141,081 B2 * | 9/2015 | Hayakawa | ......... | G03G 21/1647 |
| 10,180,651 B2 * | 1/2019 | Tagami | .............. | G03G 21/1676 |
| 2020/0301345 A1 | 9/2020 | Suzuki | | |

FOREIGN PATENT DOCUMENTS

| | | |
|---|---|---|
| JP | 2012230136 A | 11/2012 |
| JP | 2020154204 A | 9/2020 |
| JP | 2022050266 A | 3/2022 |

* cited by examiner

*Primary Examiner* — Hoan H Tran
(74) *Attorney, Agent, or Firm* — Merchant & Gould P.C.

(57) ABSTRACT

An image forming apparatus includes a housing, a drawer, and a process cartridge attachable to the drawer. The drawer can be drawn out of the housing toward one side in a first direction. The process cartridge includes: a process housing; a photosensitive drum rotatable about an axis extending in a second direction; a developing roller movable between a separated position and a contacting position relative to the photosensitive drum; and a locking member. The locking member is movable between a locking position for locking the developing roller at the separated position and an unlocking position for allowing the developing roller to move to the contacting position. The process cartridge is configured to contact a first surface of the drawer to be guided toward an attachment position on the drawer while the locking member is at the locking position during attachment of the process cartridge to the drawer.

15 Claims, 12 Drawing Sheets

IMAGE FORMING APPARATUS INCLUDING MOVABLE DRAWER HAVING GUIDE SURFACE FOR GUIDING ATTACHMENT OF PROCESS CARTRIDGE

REFERENCE TO RELATED APPLICATIONS

This application is a continuation of U.S. patent application Ser. No. 18/474,818 filed Sep. 26, 2023, which claims priority from Japanese Patent Application No. 2022-154427 filed on Sep. 28, 2022. The entire content of the priority applications is incorporated herein by reference.

BACKGROUND ART

Conventionally, an image forming apparatus including a housing, a drawer, and a cartridge attachable to the drawer has been well known in the art. Specifically, the cartridge is attachable to and detachable from the drawer. The drawer is attached to the housing with the cartridge attached to the drawer.

DESCRIPTION

In a case where a process cartridge including a photosensitive drum and a developing roller is to be attached to a drawer, easy attachment of the process cartridge to the drawer is required. Particularly, in a case where a capacity of the process cartridge is enlarged, attachment of the process cartridge to the drawer may become difficult due to the increase in weight of the process cartridge.

In view of the foregoing, it is an object of the present disclosure to provide a process cartridge which is easily attachable to a drawer.

In order to attain the above and other object, according to one aspect, the present disclosure provides an image forming apparatus including a housing, a drawer, and a process cartridge. The drawer is attachable to the housing. The drawer is configured to be drawn out of the housing toward one side in a first direction. The process cartridge is attachable to drawer. The process cartridge attached to the drawer is at an attachment position on the drawer. The process cartridge includes a process housing, a photosensitive drum, a developing roller, and a locking member. The photosensitive drum is rotatable about a drum axis extending in a second direction. The developing roller is rotatable about a developing axis extending in the second direction. The developing roller is movable between a contacting position where the developing roller contacts the photosensitive drum and a separated position where the developing roller is separated from the photosensitive drum. The locking member is movable between a locking position where the locking member locks the developing roller at the separated position and an unlocking position where the locking member allows the developing roller to move from the separated position to the contacting position. The drawer includes a rib and a first protrusion. The rib extends in the second direction. The rib is positioned on another side in the first direction relative to the attachment position of the process cartridge. The first protrusion is positioned at an end of the rib in the second direction to protrude upward therefrom. The first protrusion has a first surface configured to guide the process cartridge. The process cartridge is configured to contact the first surface to be guided toward the attachment position, relative to the drawer, while the locking member is at the locking position, during attachment of the process cartridge to the drawer.

In the image forming apparatus according to the one aspect, the process cartridge is configured to be guided toward the attachment position, relative to the drawer, by the contact with the first surface of the drawer during the attachment of the process cartridge to the drawer. With this structure, the process cartridge can be easily attached to the drawer.

Figure 1:
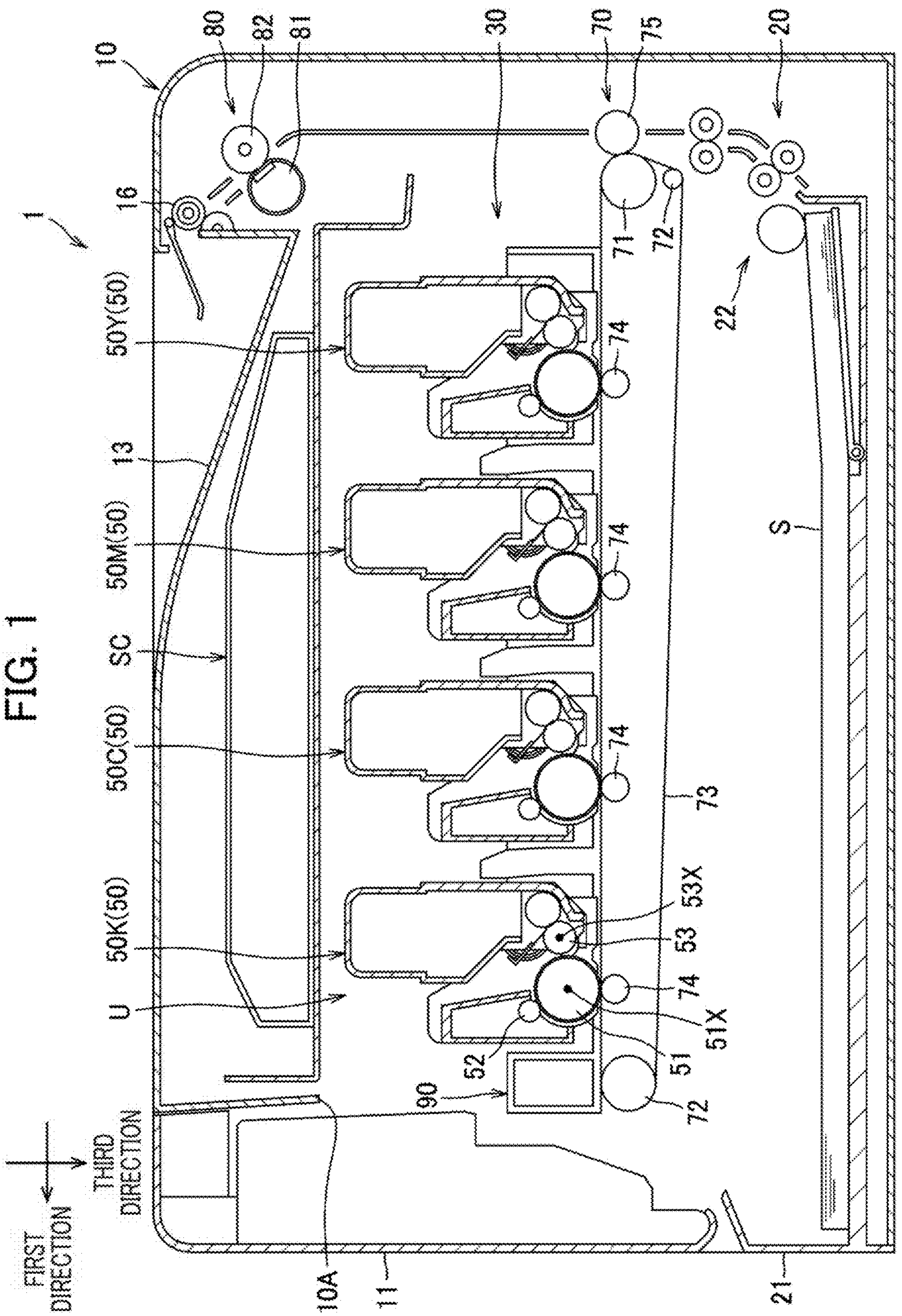
FIG. 1 is a schematic cross-sectional view of an image forming apparatus according to one embodiment of the disclosure.

An image forming apparatus 1 according to one embodiment of the disclosure will be described with reference to accompanying drawings. The image forming apparatus 1 according to the present embodiment is a color printer. As illustrated in FIG. 1, the image forming apparatus 1 includes a housing 10, a housing cover 11, a sheet supply unit 20, and an image forming unit 30.

Figure 2:
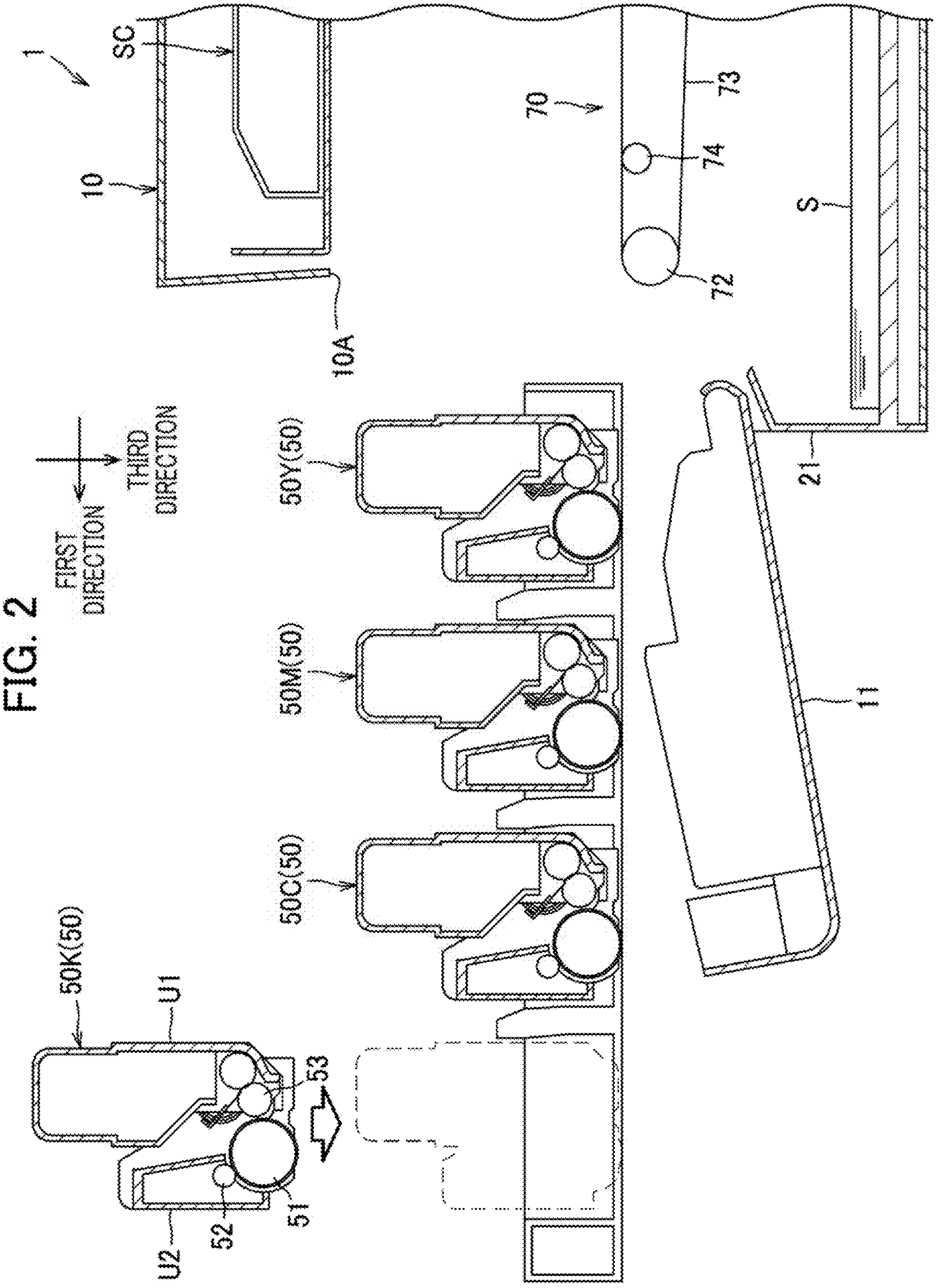
FIG. 2 is a schematic cross-sectional view of the image forming apparatus in a state where a drawer is drawn out of a housing.

In the following description, a direction in which a drawer 90 (described later) is withdrawn from the housing 10 will be referred to as a first direction (see FIG. 2). In the present embodiment, the first direction is coincident with a direction in which a plurality of process cartridges 50 (described later) is arrayed with one another. Further, an axial direction of a photosensitive drum 51 (described later) will be referred to as a second direction. Further, a direction orthogonal to each of the first direction and the second direction will be referred to as a third direction.

Further, each arrow in the drawings indicates one side in the corresponding direction. In the following description, "one end" or "one end portion" implies a component at the one side in the corresponding direction (at a leading side of the arrow), and "another end" or "another end portion" implies a component at another side in the corresponding direction (at a trailing side of the arrow).

The housing 10 has one end at one side in the first direction that is formed with an opening 10A. Through the opening 10A, the drawer 90 is configured to be pulled out from the housing 10. The housing cover 11 is configured to open and close the opening 10A. The housing cover 11 is movable between a closed position (see FIG. 1) where the housing cover 11 closes the opening 10A and an open position (see FIG. 2) where the housing cover 11 opens the opening 10A.

The sheet supply unit 20 is positioned inside the housing 10. The sheet supply unit 20 includes a sheet tray 21 and a sheet supplying mechanism 22. The sheet tray 21 is configured to store a sheet S. The sheet supplying mechanism 22 is configured to supply the sheet S from the sheet tray 21 to the image forming unit 30.

The image forming unit 30 includes a scanner SC, a process unit U, a transfer unit 70, and a fixing device 80.

The scanner SC is configured to expose a plurality of the photosensitive drums 51 to light. The scanner SC includes a laser diode, a deflector, a lens, and a mirror, all of which are not illustrated.

The process unit U includes a plurality of the process cartridges 50, and the drawer 90. In the present embodiment, the process unit U includes four process cartridges 50 and the drawer 90.

Each process cartridge 50 includes the photosensitive drum 51, a charge roller 52, and a developing roller 53. The photosensitive drum 51 is rotatable about a drum axis 51X extending in the second direction. The charge roller 52 is arranged to face the photosensitive drum 51. The developing roller 53 is rotatable about a developing axis 53X extending in the second direction. The developing roller 53 is arranged to face the photosensitive drum 51. The four process cartridges 50 respectively store toner of different colors of black, cyan, magenta, and yellow.

Specifically, the four process cartridges 50 are a black process cartridge 50K, a cyan process cartridge 50C, a magenta process cartridge 50M, and a yellow process cartridge 50Y. These four process cartridges 50K, 50C, 50M and 50Y are arrayed in this order from the one side in the first direction. Incidentally, hereinafter, characters K, C, M, Y will be added to corresponding reference numerals in the description and drawings, if parts and components should be identified in association with the respective colors of the toner.

The drawer 90 is detachably attachable to the housing 10. The drawer 90 is movable relative to the housing 10 in the first direction through the opening 10A. Specifically, the drawer 90 is movable between an accommodated position (see FIG. 1) where the drawer 90 is accommodated inside the housing 10 and a drawn-out position (see FIG. 2) where the drawer 90 is drawn out of the housing 10.

The drawer 90 is configured to receive the four process cartridges 50 thereon. Each process cartridge 50 is configured to be attached to the drawer 90 at an attachment position. The four process cartridges 50 attached to the drawer 90 are arrayed in the first direction. The drawer 90 is configured to be attached to the housing 10 with the four process cartridges 50 attached to the drawer 90.

The transfer unit 70 includes a drive roller 71, a follower roller 72, an intermediate transfer belt 73, four primary transfer rollers 74, and a secondary transfer roller 75.

The intermediate transfer belt 73 is an endless belt. The drive roller 71 and the follower roller 72 are configured to circularly move the intermediate transfer belt 73. Each primary transfer roller 74 nips the intermediate transfer belt 73 in cooperation with and a corresponding one of the photosensitive drums 51. The secondary transfer roller 75 and the drive roller 71 nip the intermediate transfer belt 73 therebetween.

The fixing device 80 is configured to fix a toner image to the sheet S. The fixing device 80 includes a heat roller 81 and a pressure roller 82. The heat roller 81 has an inner space where a heater is provided. The pressure roller 82 is positioned to face the heat roller 81. The pressure roller 82 and the heat roller 81 define a nipping portion therebetween.

In the image forming unit 30, a peripheral surface of each photosensitive drum 51 is exposed to light by the scanner SC after the peripheral surface is charged by the corresponding charge roller 52. As a result, an electrostatic latent image is formed on the peripheral surface of each photosensitive drum 51. Then, toner in each process cartridge 50 is supplied to the electrostatic latent image on the corresponding photosensitive drum 51 by the corresponding developing roller 53, so that a toner image is formed on each photosensitive drum 51.

Thereafter, the toner image formed on each photosensitive drum 51 is sequentially transferred onto the intermediate transfer belt 73 by the corresponding primary transfer roller 74 to form a color toner image. The color toner image on the intermediate transfer belt 73 is then transferred to the sheet S passing through a portion between the drive roller 71 and the secondary transfer roller 75. Then, the sheet S carrying the color toner image is thermally fixed to the sheet S while passing through the nipping portion between the heat roller 81 and the pressure roller 82.

After moving past the fixing device 80, the sheet S is discharged onto a discharge tray 13 formed on an upper surface of the housing 10 by a discharge roller 16.

Figure 3:
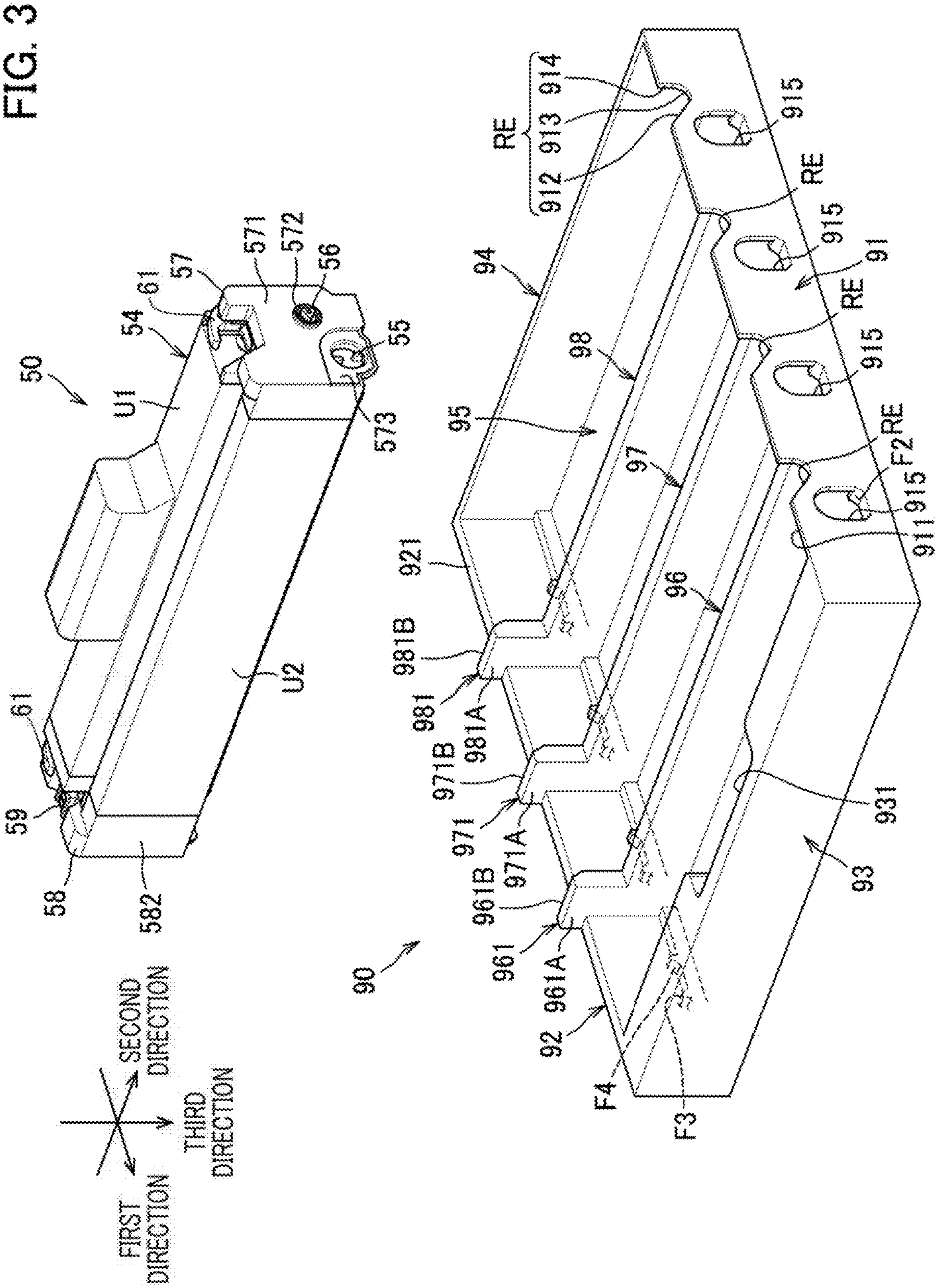
FIG. 3 is a perspective view of the drawer and a process cartridge attachable to the drawer.

As illustrated in FIG. 3, each process cartridge 50 further includes a process housing 54, a drum coupling 55, a developing coupling 56, and a memory 59.

The process housing 54 includes a developing casing U1, a drum casing U2, a first side cover 57, and a second side cover 58. The developing casing U1 is configured to store toner therein. The developing casing U1 rotatably supports the developing roller 53. The drum casing U2 is positioned between the first side cover 57 and the second side cover 58. The drum casing U2 connects the first side cover 57 and the second side cover 58 to each other. The first side cover 57 and the second side cover 58 rotatably support the photosensitive drum 51. The first side cover 57 and the second side cover 58 pivotally movably support the developing casing U1.

The drum coupling 55 is configured to rotate the photosensitive drum 51 upon receipt of a driving force from a driving member (not illustrated) provided in the housing 10. The drum coupling 55 is positioned at one end portion of the process housing 54 in the second direction. The drum coupling 55 is rotatable about a drum coupling axis extending in the second direction. In the present embodiment, the drum coupling axis is coincident with the drum axis 51X.

The developing coupling 56 is configured to rotate the developing roller 53 upon receipt of the driving force from the driving member (not illustrated) provided in the housing 10. The developing coupling 56 is positioned at the one end portion of the process housing 54 in the second direction. The developing coupling 56 is rotatable about a developing coupling axis extending in the second direction. In the present embodiment, the developing coupling axis is coincident with the developing axis 53X.

Figure 4A:
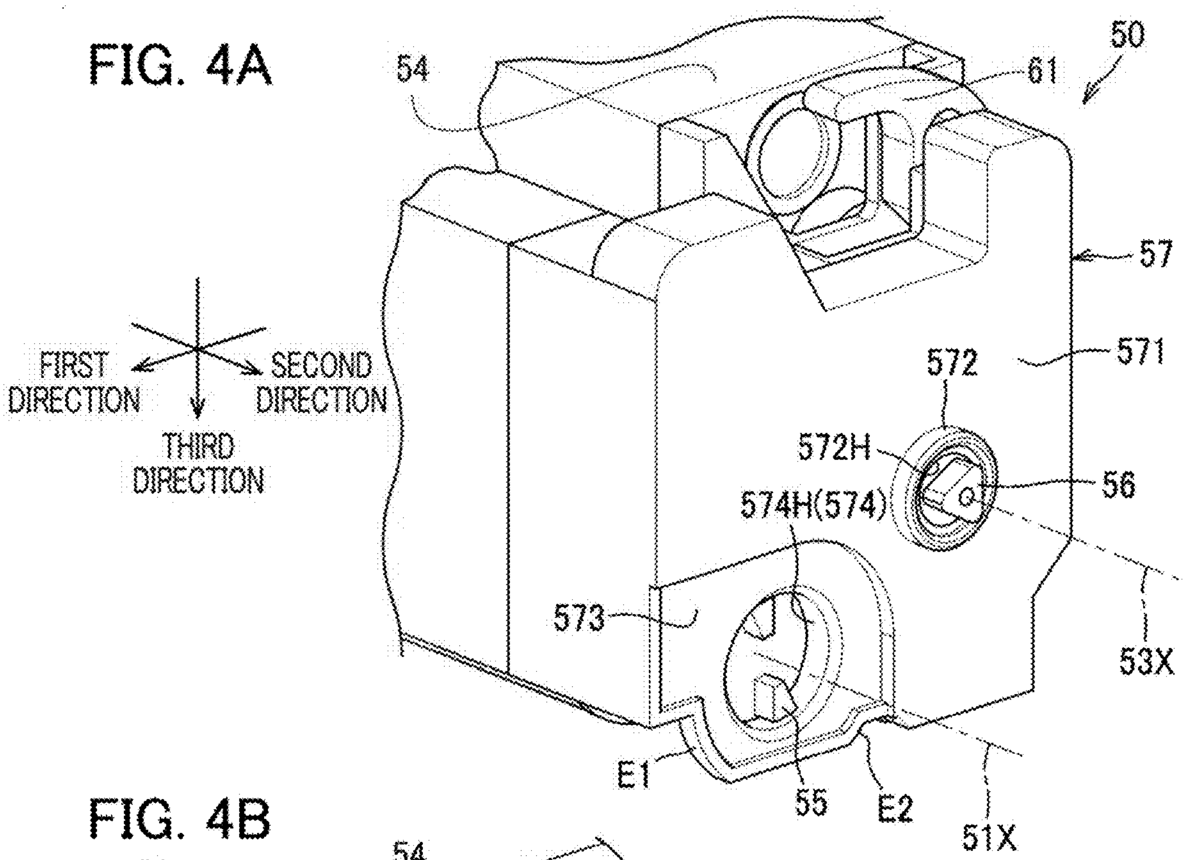
FIG. 4A is a partial-enlarged perspective view of one end portion of the process cartridge in a second direction.

As illustrated in FIG. 4A, the first side cover 57 covers the photosensitive drum 51 and the developing roller 53 from one side thereof in the second direction. The first side cover 57 includes a flat surface part 571, a collar 572, a recessed part 573, and a sleeve part 574. The first side cover 57 also has a first arcuate surface E1, and a first positioning surface E2. The flat surface part 571, the first arcuate surface E1, and the first positioning surface E2 are parts of an outer surface of the first side cover 57.

The flat surface part 571 is a flat surface facing toward the one side in the second direction.

The collar 572 protrudes from the flat surface part 571 toward the one side in the second direction. That is, the collar 572 extends in the second direction. The collar 572 covers at least a part of the developing coupling 56. In the present embodiment, the collar 572 covers an outer peripheral surface of the developing coupling 56.

The collar 572 has a collar opening 572H through which at least a part of the developing coupling 56 is exposed. The collar 572 is configured to contact a part of the drawer 90 during attachment of the process cartridge 50 to the drawer 90, so that the process cartridge 50 can be guided toward the attachment position relative to the drawer 90.

Figure 9:
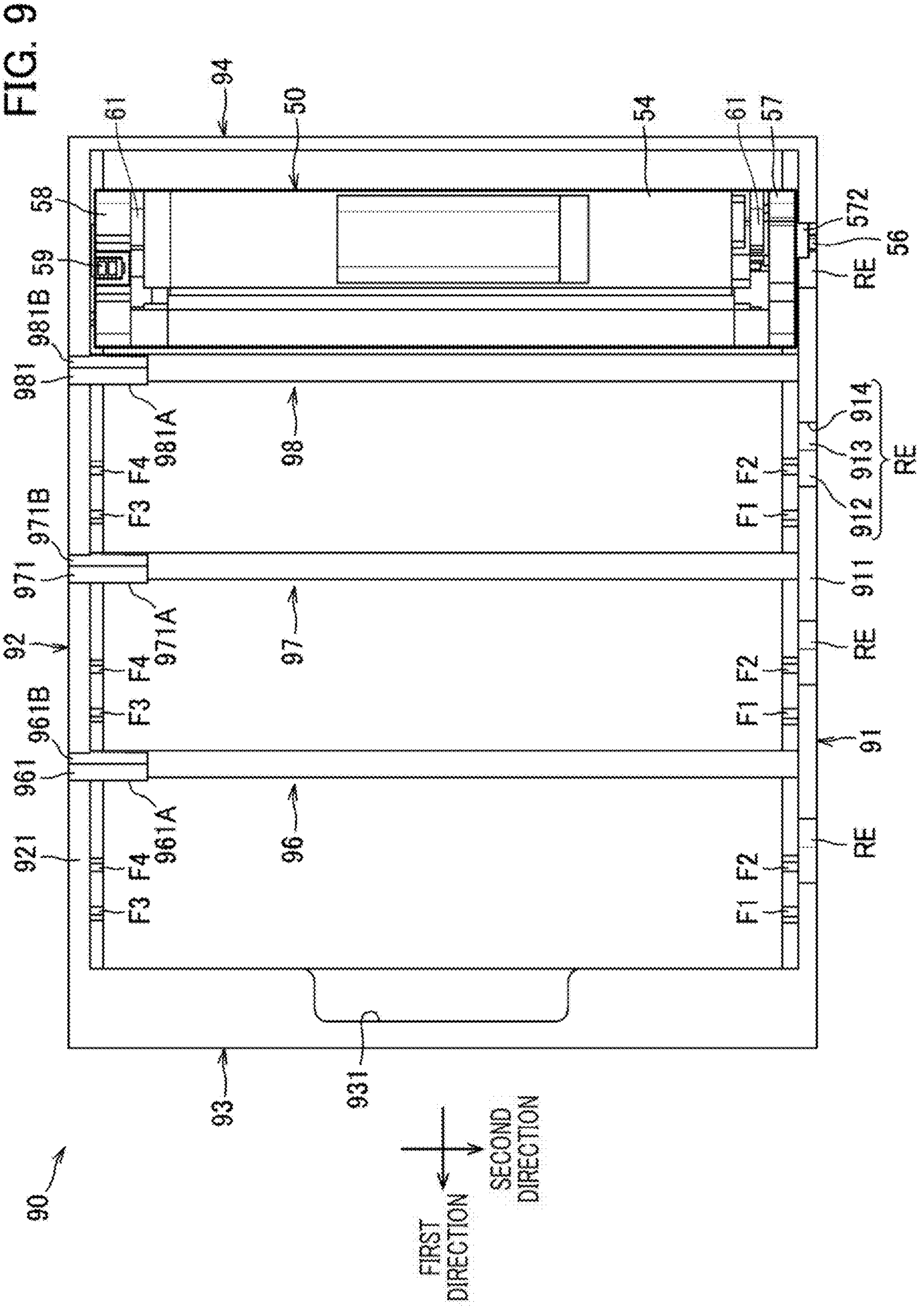
FIG. 9 is a plan view of the drawer to which the process cartridge is attached.

The developing coupling 56 is exposed, through the collar opening 572H, further toward the one side in the second direction than the collar 572 (see also FIG. 9). In other words, the developing coupling 56 protrudes further toward the one side in the second direction relative to the collar 572.

Figure 5:
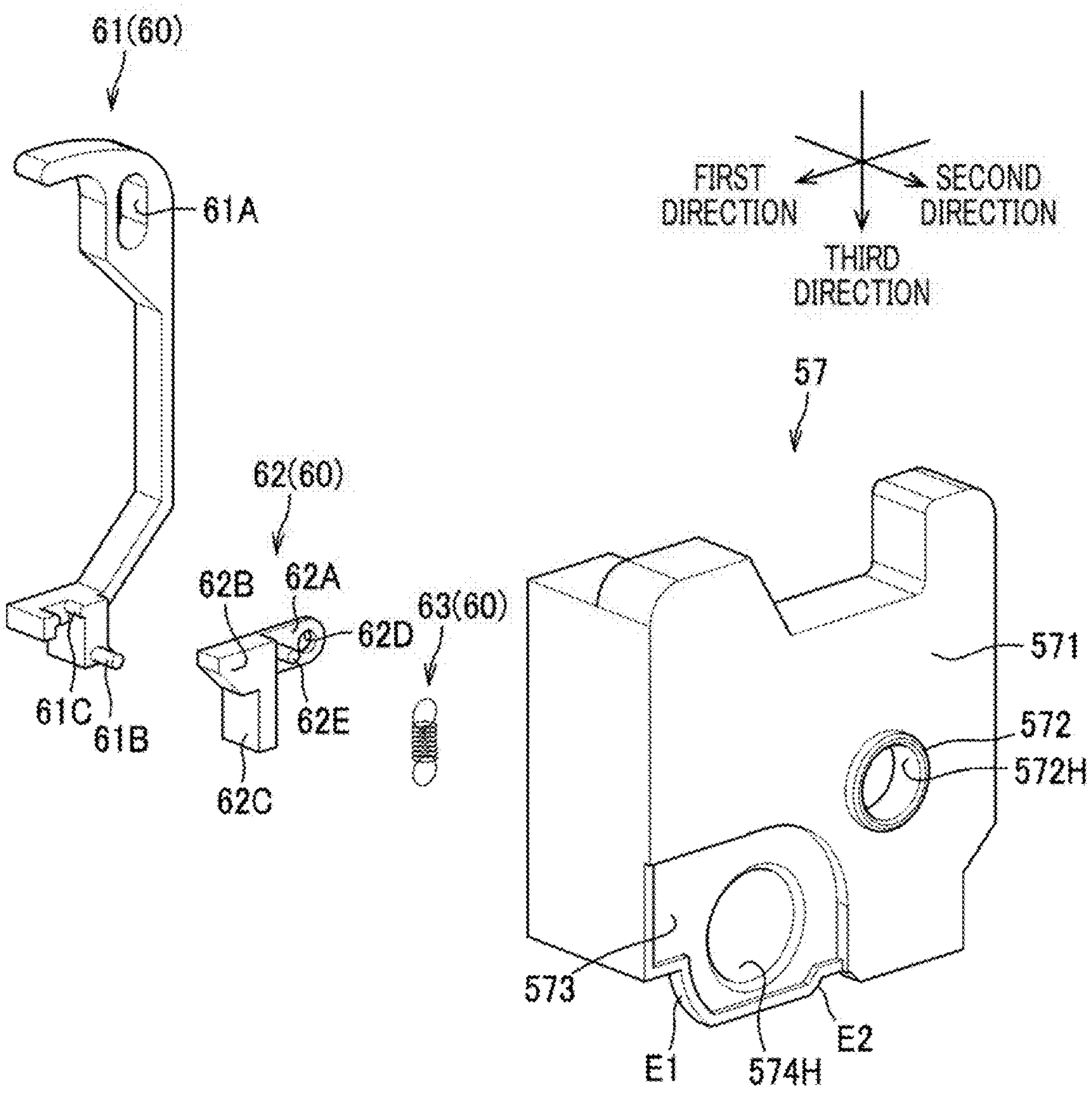
FIG. 5 is an exploded perspective view of a lever, a locking member, and a first side cover of the process cartridge.

As illustrated in FIG. 5, the recessed part 573 is recessed from the flat surface part 571 toward the other side in the second direction. The recessed part 573 is positioned to surround the sleeve part 574.

Figure 6:
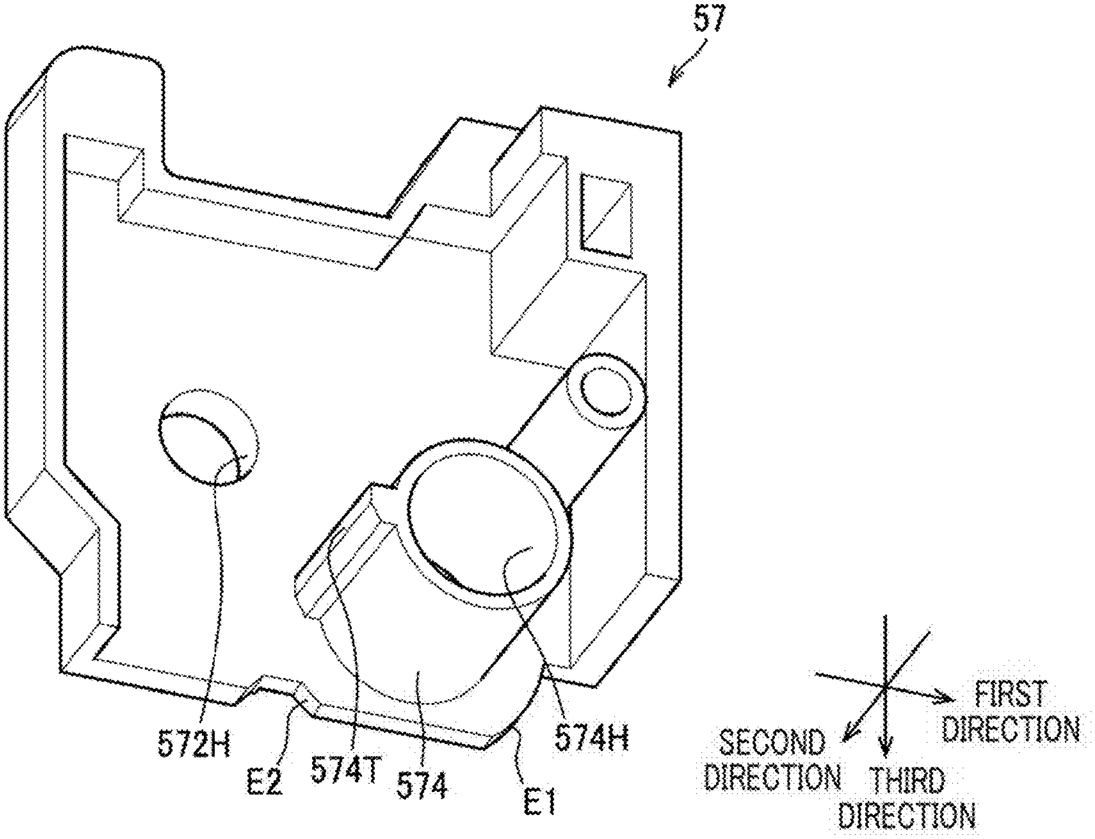
FIG. 6 is a perspective view illustrating of the first side cover from an inner side thereof.

As illustrated in FIG. 6, the sleeve part 574 has a hollow cylindrical shape. The sleeve part 574 extends from the recessed part 573 toward the other side in the second direction. The sleeve part 574 is positioned on the other side of the collar 572 in the second direction. That is, the collar 572 is positioned to protrude further toward the one side in the second direction than the sleeve part 574 is.

The sleeve part 574 has a drum coupling opening 574H through which the drum coupling 55 extends. With the drum coupling 55 inserted in the drum coupling opening 574H, the sleeve part 574 rotatably supports the drum coupling 55. The sleeve part 574 has a protrusion 574T. The protrusion 574T protrudes toward the other side in the first direction from an outer peripheral surface of the sleeve part 574.

Turning back to FIG. 4A, the first arcuate surface E1 is positioned at one end of the first side cover 57 at one side in the third direction. The first arcuate surface E1 is positioned on the one side of the drum axis 51X in the first direction. The first arcuate surface E1 has an arcuate shape centered on the drum axis 51X. The drum axis 51X is positioned between the developing axis 53X and the first arcuate surface E1 in the third direction.

The first positioning surface E2 is positioned at another end of the recessed part 573 in the first direction. The first positioning surface E2 is inclined relative to the first direction. Specifically, the first positioning surface E2 diagonally extends toward the one side in the first direction as extending toward the one side in the third direction. The drum axis 51X is positioned between the first arcuate surface E1 and the first positioning surface E2 in the first direction. Further, the drum axis 51X is positioned between the developing axis 53X and the first positioning surface E2 in the third direction. The first positioning surface E2 is positioned between the drum axis 51X and the developing axis 53X in the first direction.

Figure 4B:
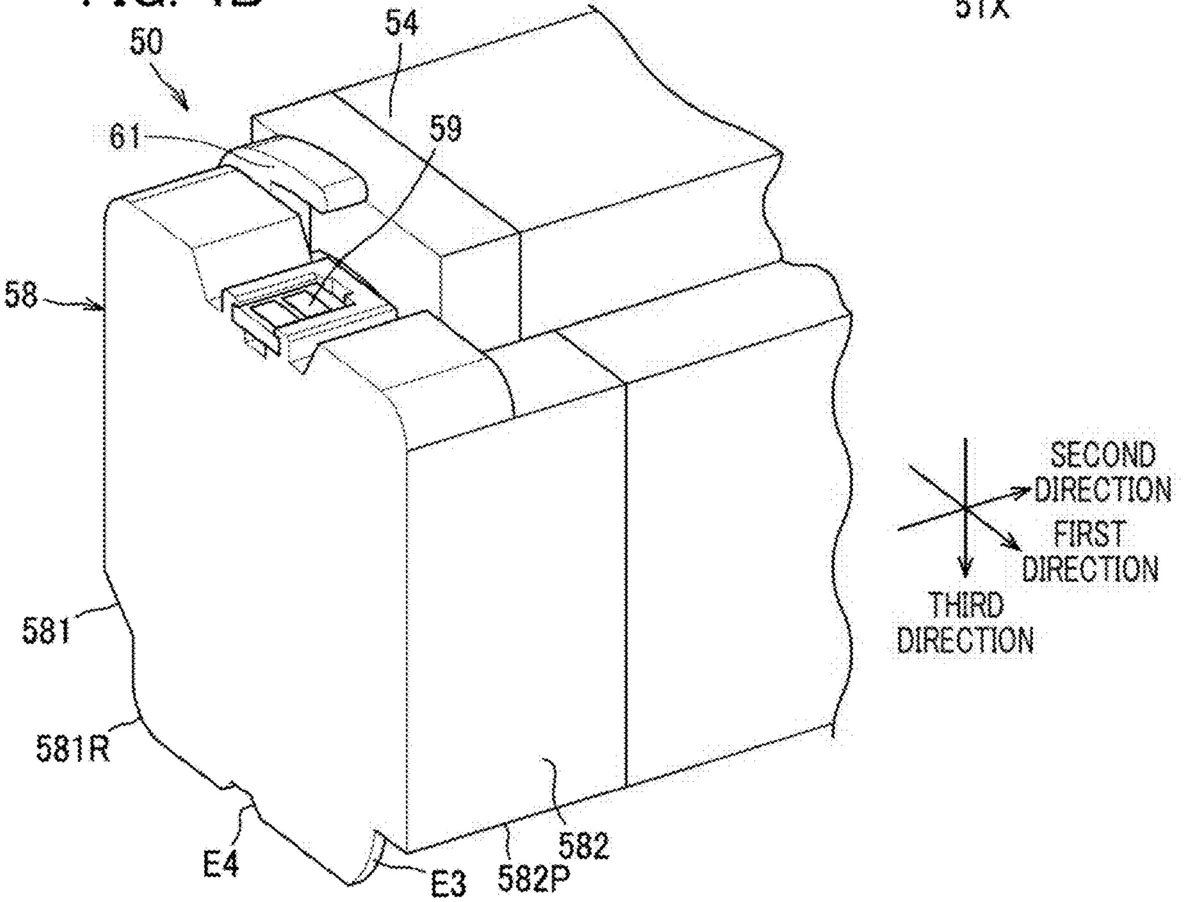
FIG. 4B is a partial-enlarged perspective view of another end portion of the process cartridge in the second direction.

As illustrated in FIG. 4B, the second side cover 58 covers the photosensitive drum 51 and the developing roller 53 from the other side in the second direction. The first second side cover 58 has a second arcuate surface E3, a second positioning surface E4, a first abutment surface 581, a third arcuate surface 581R, and a second abutment surface 582. The second arcuate surface E3, the second positioning surface E4, the first abutment surface 581, and the second abutment surface 582 are parts of an outer surface of the second side cover 58.

The second arcuate surface E3 is positioned at one end of the second side cover 58 in the first direction. The second arcuate surface E3 is positioned at one end of the second side cover 58 in the third direction. The second arcuate surface E3 has an arcuate shape centered on the drum axis 51X. The second arcuate surface E3 has the same configuration as the first arcuate surface E1 of the first side cover 57. The second arcuate surface E3 is overlapped with the first arcuate surface E1 as viewed in the second direction.

The second positioning surface E4 is positioned at the one end of the second side cover 58 in the third direction. The second positioning surface E4 is sloped relative to the first direction. Specifically, the second positioning surface E4 diagonally extends toward the one side in the third direction as extending toward the one side in the first direction. The second positioning surface E4 has the same configuration as the first positioning surface E2 of the first side cover 57. The second positioning surface E4 is overlapped with the first positioning surface E2 as viewed in the second direction.

The first abutment surface 581 is positioned at another end of the second side cover 58 in the first direction. The first abutment surface 581 is sloped relative to the third direction. Specifically, the first abutment surface 581 diagonally extends toward the one side in the first direction as extending toward the one side in the third direction. The second abutment surface 582 constitutes one end surface of the second side cover 58 in the first direction. The second abutment surface 582 extends in the third direction. The second abutment surface 582 has a corner 582P at one end thereof in the third direction.

The third arcuate surface 581R is positioned at the one end of the second side cover 58 in the third direction. The third arcuate surface 581R is positioned on the one side of the first abutment surface 581 in the third direction.

The memory 59 is configured to store information about the process cartridge 50. The memory 59 is attached to the second side cover 58. The second side cover 58 is positioned on another end of the second side cover 58 in the third direction.

Figure 7A:
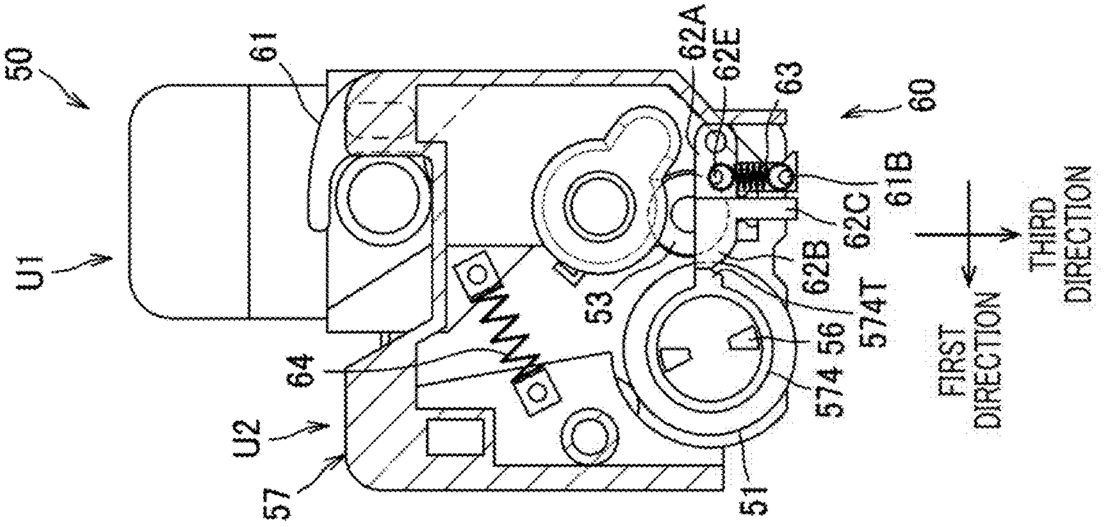
FIG. 7A is a view illustrating a separation mechanism in a state where the lever is at a first position.
Figure 7B:
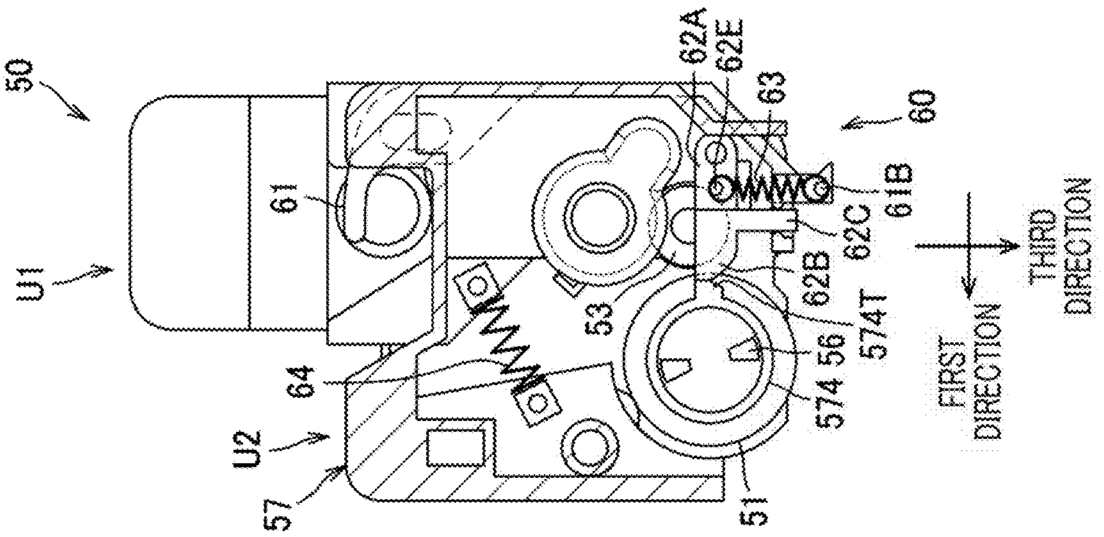
FIG. 7B is a view illustrating the separation mechanism in a state where the lever is at a second position.
Figure 7C:
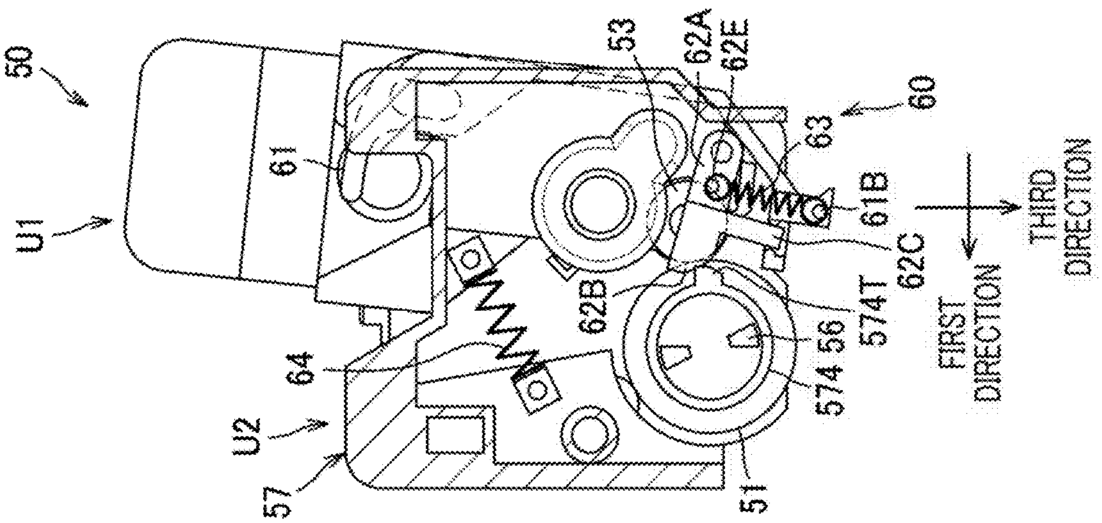
FIG. 7C is a view illustrating the separation mechanism in a state where the lever is at a third position.

As illustrated in FIGS. 7A through 7C, each process cartridge 50 further includes a pair of separation mechanisms 60 for separating the photosensitive drum 51 and the developing roller 53 from each other. One of the separation mechanisms 60 is supported by the first side cover 57, and the other separation mechanism 60 is supported by the second side cover 58. According to the present embodiment, the developing roller 53 is movable between a contacting position where the developing roller 53 contacts the photosensitive drum 51 and a separated position where the developing roller 53 is separated from the photosensitive drum 51. That is, the separation mechanism 60 is configured to move the developing roller 53 from the contacting position to the separated position. Incidentally, the developing roller 55 is normally urged toward the photosensitive drum 51 by an urging force of a compression coil spring 64 illustrated in FIGS. 7A through 7C.

As illustrated in FIG. 5, each separation mechanism 60 includes a lever 61, a locking member 62, and a tension coil spring 63.

The lever 61 is configured to move the developing roller 34 between the contacting position and the separated position. The lever 61 is movable in the third direction between a first position illustrated in FIG. 7A and a second position illustrated in FIG. 7B. The lever 61 is also pivotally movable between the second position illustrated in FIG. 7B and a third position illustrated in FIG. 7C.

The lever 61 is configured to move the locking member 62 from an unlocking position (illustrated in FIG. 7C) to a locking position (illustrated in FIGS. 7A and 7B). Specifically, the locking member 62 is at the locking position in a case where the lever 61 is either at the first position or the second position. The locking member 62 is at the unlocking position in a case where the lever 61 is at the third position. The lever 61 presses the locking member 62 to move the locking member 62 from the locking position (FIG. 7B) to the unlocking position (FIG. 7C) in a case where the drawer 90 is attached to the housing 10 with the process cartridges 50 attached to the drawer 90.

The lever 61 extends in the third direction. The lever 61 has an elongated shape extending in the third direction. The lever 61 has an elongated hole 61A, a protrusion 61B, and a notch 61C. The protrusion 61B and the notch 61C are positioned at one end portion of the lever 61 in the third direction, whereas the elongated hole 61A is positioned at another end portion of the lever 61 in the third direction.

The locking member 62 is configured to lock the developing roller 53 at the separated position. The locking member 62 is movable between the locking position (illustrated in FIGS. 7A and 7B) and the unlocking position (illustrated in FIG. 7C). The locking member 62 locks the developing roller 53 to the separated position when the locking member 62 is at the locking position. The locking member 62 allows the developing roller 53 to move from the separated position to the contacting position when the locking member 62 is at the unlocking position.

The locking member 62 includes a first part 62A, a second part 62B, and a third part 62C. The first part 62A has a hole 62D and a protrusion 62E. The second part 62B is positioned opposite the hole 62D with respect to the protrusion 62E. The third part 62C is positioned in the notch 61C of the lever 61. The third part 62C extends from a boundary between the first part 62A and the second part 62B. As illustrated in FIG. 7A, when the locking member 62 is at the locking position, the first part 62A and the second part 62B extend in the first direction, and the third part 62C extends toward the one side in the third direction.

The tension coil spring 63 has one end portion hooked to the protrusion 61B of the lever 61, and another end portion hooked to the protrusion 62E of the locking member 62.

FIG. 7A illustrates the process cartridge 50 that is detached from the housing 10 of the image forming apparatus 1. As illustrated in FIG. 7A, in a state where the process cartridge 50 is detached from the housing 10, the lever 61 is at the first position, the locking member 62 is at the locking position, and the developing roller 53 is at the separated position.

FIG. 7B illustrates the process cartridge 50 that is attached to the housing 10 through the drawer 90 while the process cartridge 50 is not involved in a printing operation. In other words, FIG. 7B illustrates a state of the process cartridge 50 after the drawer 90 with the process cartridge 50 attached thereto has been moved to the inside of the housing 10 (accommodated position) from the outside of the housing 10 (drawn-out position). In accordance with the movement of the drawer 90 from the outside to the inside of the housing 10, the other end of the lever 61 in the third direction is pressed by a portion of the housing 10 to move the lever 61 from the first position to the second position.

As illustrated in FIG. 7B, in a state where the process cartridge 50 is attached to the housing 10 through the drawer 90 and printing is not performed, the lever 61 is at the second position, the locking member 62 is at the locking position, and the developing roller 53 is at the separated position. When the lever 61 is at the second position, a part of the lever 61 (the one end portion of the lever 61 in the third direction) protrudes further toward the one side in the third direction relative to the first side cover 57. The tension coil spring 63 is in a more stretched state when the lever 61 is at the second position than when the lever 61 is at the first position.

FIG. 7C illustrates a state of the process cartridge 50 that is attached to the housing 10 while printing is performed. Although not illustrated in the drawings, the image forming apparatus 1 includes a pressing member which is configured to push the one end portion in the third direction of the lever 61 (the part protruding toward the one side in the third direction from the first side cover 57) toward the one side in the third direction as well as toward the other side in the third direction.

As the pressing member pushes the protruding end portion of the lever 61 toward the one side in the first direction, the lever 61 is pivotally moved from the second position to the third position.

In response to the pivotal movement of the lever 61 from the second position to the third position, the notch 61C of the lever 61 presses the locking member 62 toward the one side in the first direction (leftward in FIG. 7C), thereby causing the locking member 62 to pivotally move from the locking position to the unlocking position to disengage a tip end of the locking member 62 (the second part 62B) from the protrusion 574T of the sleeve part 574 of the first side cover 57.

Upon disengagement of the locking member 62 from the protrusion 574T, the developing roller 53 pivotally moves from the separated position to the contacting position due to the urging force of the compression coil spring 64. As a consequence, the developing roller 53 comes into contact with the photosensitive drum 51.

On the other hand, for separating the developing roller 53 from the photosensitive drum 51, the pressing member presses the tip end of the lever 61 toward the other side in the first direction, causing the lever 61 to pivotally move from the third position (FIG. 7C) to the second position (FIG. 7B).

In response to the pivotal movement of the lever 61 from the third position to the second position, the lever 61 pulls the locking member 62 toward the locking position through the tension coil spring 63. Accordingly, the locking member 62 is pivotally moved from the unlocking position to the locking position, thereby causing the tip end of the locking member 62 to make contact with the protrusion 574T.

As the locking member 62 pivotally moves from the unlocking position to the locking position, the developing casing U1 is pivotally moved against the urging force of the compression coil spring 64 to move the developing roller 53 from the contacting position to the separated position.

In a case where the part of the housing 10 stops applying pressure to the lever 61 while the lever 61 is at the second position, the lever 61 is moved from the second position (FIG. 7B) to the first position (FIG. 7A) due to the urging force of the tension coil spring 63.

The second side cover 58 has an inner structure corresponding to the sleeve part 574 of the first side cover 57 (illustrated in FIG. 6) for supporting the corresponding separation mechanism 60.

As illustrated in FIGS. 3 and 9, the drawer 90 includes a first wall 91, a second wall 92, a third wall 93, a fourth wall 94, a fifth wall 95, a first rib 96, a second rib 97, and a third rib 98.

The first wall 91 extends in the first direction, and constitutes one end of the drawer 90 at the one side in the second direction. The first wall 91 has a first end surface 911, four notches RE, and four first holes 915.

The first end surface 911 is positioned at an end of the first wall 91 at the other side in the third direction. Specifically, the first end surface 911 constitutes an end surface of the first wall 91 at the other side in the third direction. The first wall 91 extends in the first direction and faces toward the other side in the third direction. Each of the four notches RE is recessed from the first end surface 911 toward the one side in the third direction (i.e., toward the fifth wall 95). Each notch RE has a first guide surface 912, a second guide surface 913, and a third guide surface 914. Each first hole 915 allows the drum coupling 55 of the corresponding process cartridge 50 to be exposed to the outside of the drawer 90 when the process cartridge 50 is attached to the drawer 90 (see FIG. 12).

The first guide surface 912, the second guide surface 913, and the third guide surface 914 function to guide the corresponding process cartridge 50 to the attachment position on the drawer 90. The first guide surface 912 extends from the first end surface 911 diagonally with respect to the first direction. Specifically, the first guide surface 912 is inclined relative to the first direction such that the first guide surface 912 extends toward the one side in the third direction as extending toward the other side in the first direction.

The second guide surface 913 extends continuously with the first guide surface 912. The second guide surface 913 is an arcuate surface to conform to the outer peripheral surface of the collar 572 of the first side cover 57 when the corresponding process cartridge 50 is at the attachment position on the drawer 90. The third guide surface 914 extends in the third direction. The third guide surface 914 is positioned between the first end surface 911 and the second guide surface 913. The third guide surface 914 extends to connect the second guide surface 913 to the first end surface 911.

The second wall 92 extends in the first direction, and constitutes an end of the drawer 90 at the other side in the second direction. The second wall 92 has a second end surface 921. The second end surface 921 is positioned at another end of the second wall 92 in the third direction. That is, the second end surface 921 constitutes an end surface of the second wall 92 at the other side in the third direction. The second end surface 921 extends in the first direction, and faces toward the other side in the third direction.

The third wall 93 extends in the second direction, and constitutes an end of the drawer 90 at the one side in the first direction. The third wall 93 connects one end portion of the first wall 91 in the first direction to one end portion of the second wall 92 in the first direction. The third wall 93 has a hand-held portion 931. The hand-held portion 931 is positioned at a center portion of the third wall 93 in the second direction. The hand-held portion 931 is positioned at another end of the third wall 93 in the first direction. The hand-held portion 931 is configured to be held by a user for attachment of the drawer 90 to the housing 10.

The fourth wall 94 extends in the second direction, and constitutes an end of the drawer 90 at the other side in the first direction. The fourth wall 94 connects another end portion of the first wall 91 in the first direction to another end portion of the second wall 92 in the first direction.

The fifth wall 95 is a bottom wall of the drawer 90. The fifth wall 95 constitutes an end of the drawer 90 at the one side in the third direction. The fifth wall 95 connects together one end of the first wall 91 in the third direction, one end of the second wall 92 in the third direction, one end of the third wall 93 in the third direction, and one end of the fourth wall 94 in the third direction. The fifth wall 95 has abutment surfaces for fixing the process cartridges 50 in position.

Specifically, the fifth wall 95 has four abutment surfaces, namely, a first abutment surface F1, a second abutment surface F2, a third abutment surface F3, and a fourth abutment surface F4, for each one of the process cartridges 50. That is, in the present embodiment, the fifth wall 95 has sixteen abutment surfaces.

Figure 8A:
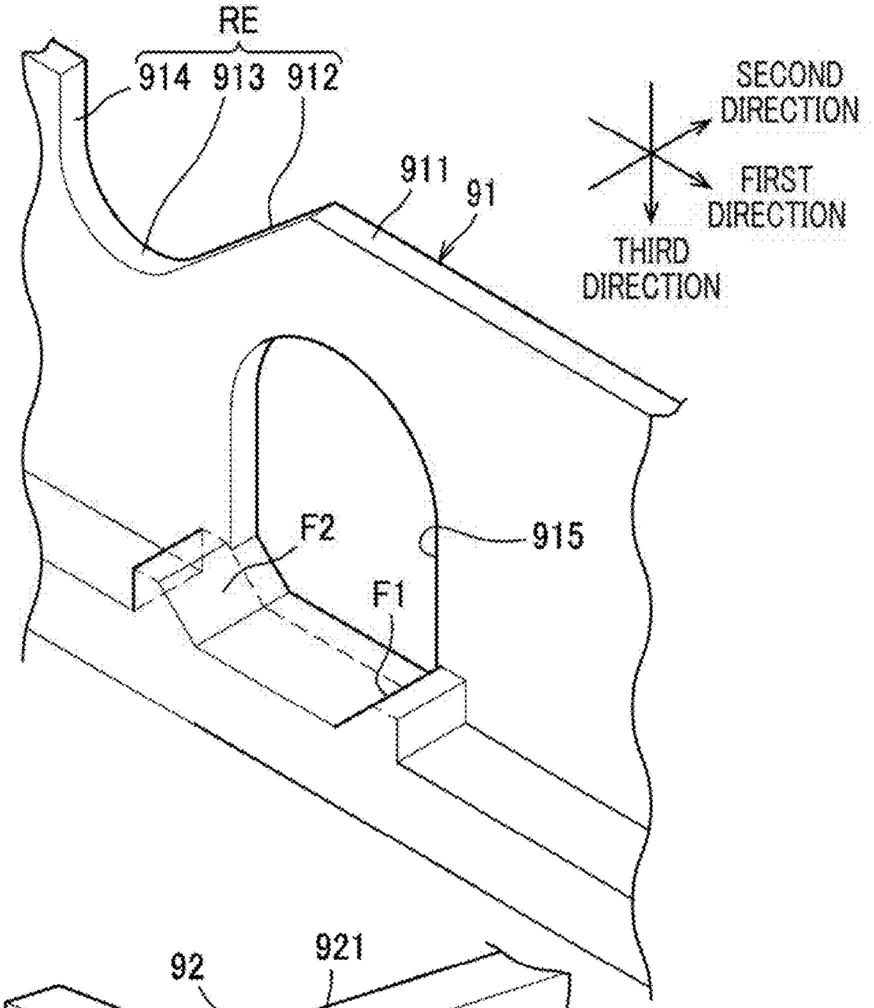
FIG. 8A is a partially enlarged perspective view of a first abutment surface and a second abutment surface of the drawer.
Figure 11:
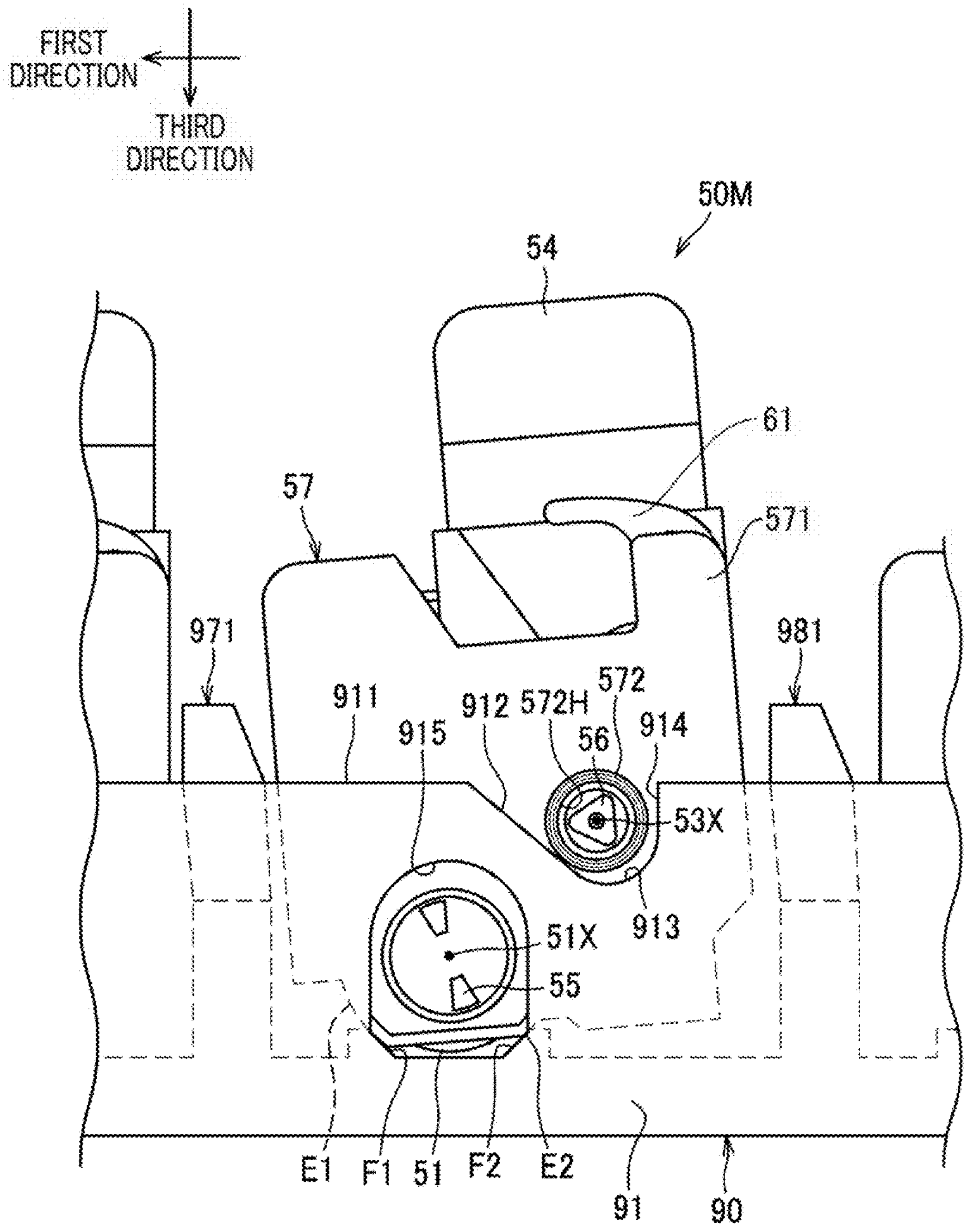
FIG. 11 is a view for description of abutment of a collar of the process cartridge on a first guide surface of the drawer in the process of attaching the process cartridge to the drawer.

As illustrated in FIGS. 8A and 11, the first abutment surface F1 is configured to contact the first arcuate surface E1 of the first side cover 57 during the attachment of the corresponding process cartridge 50 to the drawer 90. The first abutment surface F1 extends diagonally with respect to the first direction. Specifically, the first abutment surface F1 extends diagonally toward the other side in the third direction as extending toward the one side in the first direction.

The second abutment surface F2 is configured to contact the first positioning surface E2 of the first side cover 57 during the attachment of the corresponding process cartridge 50 to the drawer 90. The second abutment surface F2 extends diagonally with respect to the first direction. Specifically, the second abutment surface F2 extends diagonally toward the one side in the third direction as extending toward the one side in the first direction.

Figure 8B:
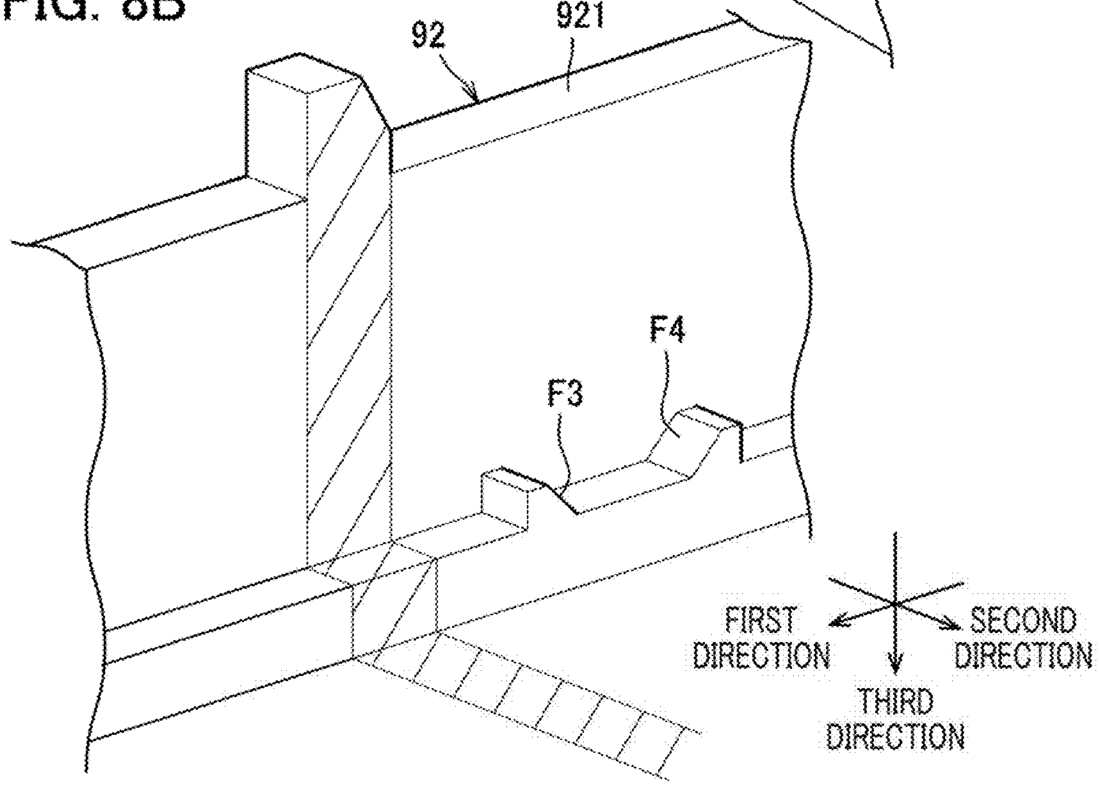
FIG. 8B is a partially enlarged perspective view of a third abutment surface and a fourth abutment surface of the drawer.

As illustrated in FIGS. 3 and 8B, the third abutment surface F3 is configured to contact the second arcuate surface E3 of the second side cover 58 during the attachment of the corresponding process cartridge 50 to the drawer 90. The third abutment surface F3 extends diagonally with respect to the first direction. Specifically, the third abutment surface F3 extends diagonally toward the other side in the third direction as extending toward the one side in the first direction. The third abutment surface F3 has the same configuration as the first abutment surface F1. The third abutment surface F3 is overlapped with the first abutment surface F1 as viewed in the second direction.

The fourth abutment surface F4 is configured to contact the second positioning surface E4 of the second side cover 58 during the attachment of the corresponding process cartridge 50 to the drawer 90. The fourth abutment surface F4 extends diagonally with respect to the first direction. Specifically, the fourth abutment surface F4 extends diagonally toward the one side in the third direction as extending toward the one side in the first direction. The fourth abutment surface F4 has the same configuration as the second abutment surface F2. The fourth abutment surface F4 is overlapped with the second abutment surface F2 as viewed in the second direction.

The first rib 96 extends in the second direction. The first rib 96 extends from the fifth wall 95 toward the other side in the third direction. The first rib 96 is positioned between the black process cartridge 50K and the cyan process cartridge 50C upon attachment of the four process cartridges 50 to the drawer 90. The first rib 96 has a first protrusion 961 configured to guide the process cartridges 50K and 50C for attachment of the process cartridges 50K, 50C to the drawer 90.

The first protrusion 961 is positioned at another end of the first rib 96 in the second direction. The first protrusion 961 protrudes toward the other side in the third direction. The first protrusion 961 has a first surface 961A and a second surface 961B. The first surface 961A is configured to contact the first abutment surface 581K of the second side cover 58K of the black process cartridge 50K for attachment of the black process cartridge 50K to the drawer 90. The second surface 961B is configured to contact the second abutment surface 582C of the second side cover 58C of the cyan process cartridge 50C for attachment of the cyan process cartridge 50C to the drawer 90.

The second rib 97 extends in the second direction. The second rib 97 extends from the fifth wall 95 toward the other side in the third direction. The second rib 97 is positioned between the cyan process cartridge 50C and the magenta process cartridge 50M upon attachment of the four process cartridges 50 to the drawer 90. The second rib 97 has a second protrusion 971 configured to guide the process cartridges 50C and 50M for attachment of the process cartridges 50C, 50M to the drawer 90.

The second protrusion 971 is positioned at another end of the second rib 97 in the second direction. The second protrusion 971 protrudes toward the other side in the third direction. The second protrusion 971 has a first surface 971A and a second surface 971B. The first surface 971A is configured to contact the first abutment surface 581C of the second side cover 58C of the cyan process cartridge 50C for attachment of the cyan process cartridge 50C to the drawer 90. The second surface 971B is configured to contact the second abutment surface 582M of the second side cover 58M of the magenta process cartridge 50M for attachment of the magenta process cartridge 50M to the drawer 90.

The third rib 98 extends in the second direction. The third rib 98 extends from the fifth wall 95 toward the other side in the third direction. The third rib 98 is positioned between the magenta process cartridge 50M and the yellow process cartridge 50Y upon attachment of the four process cartridges 50 to the drawer 90. The third rib 98 has a third protrusion 981 configured to guide the process cartridges 50M and 50Y for attachment of the process cartridges 50M, 50Y to the drawer 90.

The third protrusion 981 is positioned at another end of the third rib 98 in the second direction. The third protrusion 981 protrudes toward the other side in the third direction. The third protrusion 981 has a first surface 981A and a second surface 981B. The first surface 981A is configured to contact the first abutment surface 581M of the second side cover 58M of the magenta process cartridge 50M for attachment of the magenta process cartridge 50M to the drawer 90. The second surface 981B is configured to contact the second abutment surface 582Y of the second side cover 58Y of the yellow process cartridge 50Y for attachment of the yellow process cartridge 50Y to the drawer 90.

Next, a process of attaching the process cartridge 50 to the attachment position (see FIG. 12) on the drawer 80 will be described with reference to FIGS. 10 through 12.

As illustrated in FIG. 3, for attaching the process cartridge 50 to the drawer 90, the process cartridge 50 is brought closer to the drawer 90 from above. In the following description, attachment of the magenta process cartridge 50M to the drawer 90 be described as a representative example among the four process cartridges 50.

In the present embodiment, in the process of attaching the process cartridge 50M to the drawer 90, the process cartridge 50M is likely to tilt because the photosensitive drum 51 is provided in a portion of the process cartridge 50M at the one side in the first direction (i.e., at a position offset toward the one side from a center of the magenta process cartridge 50M in the first direction).

Figure 10:
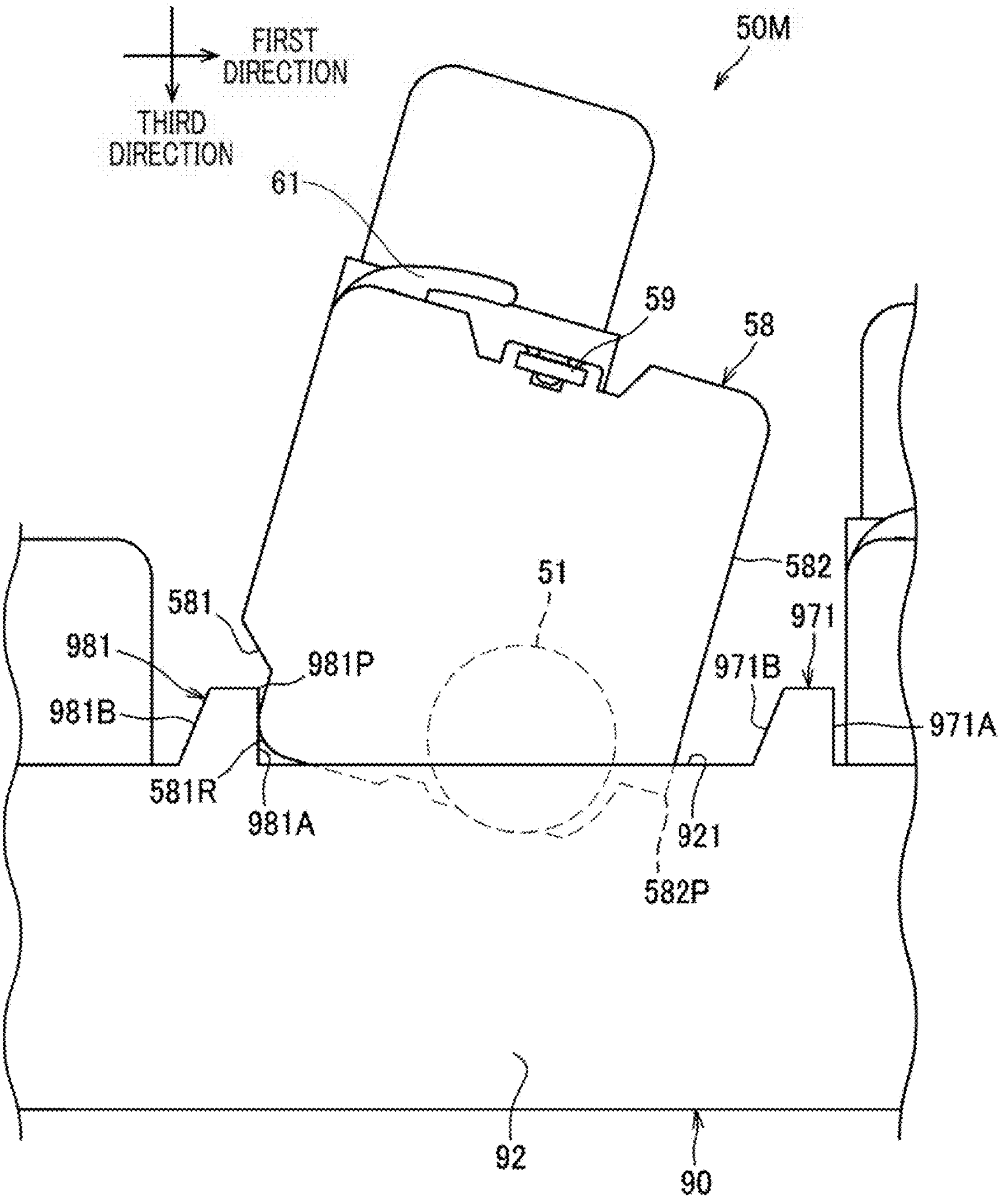
FIG. 10 is a view for description of abutment of the process cartridge on a protrusion of the drawer in a process of attaching the process cartridge to the drawer.

For example, assume a case that the process cartridge 50M tilts as illustrated in FIG. 10 such that the other end portion of the process cartridge 50M in the third direction (upper end portion in FIG. 10) is moved toward the one side in the first direction (rightward in FIG. 10). In this case, the third arcuate surface 581R of the second side cover 58 may abut on the first surface 981A of the third protrusion 981 of the drawer 90. After the third arcuate surface 581R abuts on the first surface 981A, the first abutment surface 581 is likely to come into contact with a corner 981P of the first surface 981A of the third protrusion 981. Due to the contact of the first abutment surface 581 with the corner 981P of the first surface 981A, the process cartridge 50M is moved toward the one side in the first direction.

On the other hand, assume another case that the process cartridge 50M tilts such that the other end portion of the process cartridge 50M in the third direction (upper end portion in FIG. 10) is moved toward the other side in the first direction (leftward in FIG. 10). In this case, the corner 582P of the second side cover 58 may abut on the second surface 971B of the second protrusion 971 of the drawer 90. Due to the contact of the corner 582P of the second side cover 58 with the second surface 971B of the second protrusion 971, the process cartridge 50M is moved toward the other side in the first direction.

Further, in the case that the other end portion of the process cartridge 50M in the third direction is tilted toward the one side in the first direction, the recessed part 573 of the first side cover 57 is inserted into the drawer 90 before the flat surface part 571 of the first side cover 57 inserted into the drawer 90. Following the entry of the recessed part 573 into the drawer 90, the flat surface part 571 can reliably enter inside the drawer 90.

As the process cartridge 50M is moved further closer to the drawer 90 from the state illustrated in FIG. 10, the collar 572 of the first side cover 57 is brought into contact with the first guide surface 912 of the corresponding notch RE, as illustrated in FIG. 11. In this way, the process cartridge 50M is guided toward the attachment position by the contact of the collar 572 with the first guide surface 912 in the process of attaching the process cartridge 50M to the drawer 90.

As the collar 572 is guided along the first guide surface 912, the first arcuate surface E1 of the first side cover 57 is brought into contact with the first abutment surface F1 of the drawer 90 and the first positioning surface E2 of the first side cover 57 is brought into contact with the second abutment surface F2 of the drawer 90. At the same time, although not illustrated in the drawings, the second arcuate surface E3 of the second side cover 58 is brought in contact with the third abutment surface F3 of the drawer 90, and the second positioning surface E4 of the second side cover 58 is brought into contact with the fourth abutment surface F4 of the drawer 90. As a result, the drum axis 51X of the process cartridge 50M reaches a proper position thereof relative to the drawer 90. Incidentally, at this time, the developing axis 53X has not yet arrived at a proper position thereof.

After the drum axis 51X is located at the proper position, the process cartridge 50M is pivotally movable about the drum axis 51X with the first arcuate surface E1 and the first positioning surface E2 in contact with the first abutment surface F1 and the second abutment surface F2, respectively.

Figure 12:
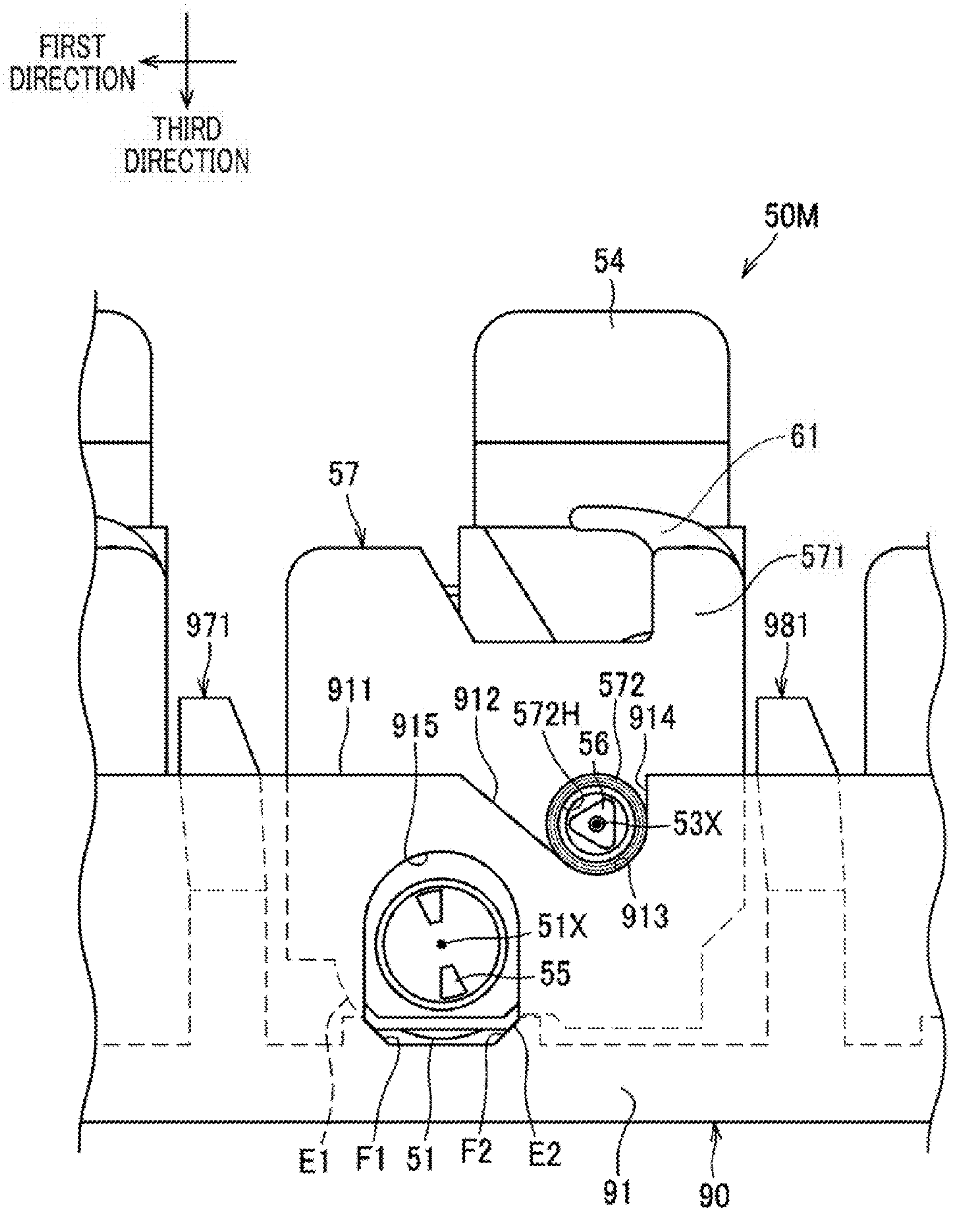
FIG. 12 is a view illustrating the process cartridge in an attachment position on the drawer.

As illustrated in FIG. 12, the collar 572 is brought into contact with the second guide surface 913 and the third guide surface 914 as a result of pivotal movement of the process cartridge 50M about the drum axis 51X. Consequently, the position of the process cartridge 50M is fixed at the attachment position on the drawer 90. In this way, the developing axis 53X comes to its proper position as a result of the pivotal movement of the process cartridge 50M about the drum axis 51X with the first arcuate surface E1 in contact with the first abutment surface F1 after the drum axis 51X is positioned at its proper position.

According to the above-described configuration of the present embodiment, the following technical advantages can be obtained.

In the process of attaching the process cartridge 50 to the drawer 90, the process cartridge 50 is configured to be guided toward the attachment position, relative to the drawer 90, by the contact of the collar 572 of the first side cover 57 with the first guide surface 912 of the corresponding notch RE of the drawer 90. In this way, attachment of the process cartridge 50 to the drawer 90 can be easily performed, since the collar 572 contacts the part of the drawer 90 to be guided toward the attachment position.

Further, in the process of attaching the process cartridge 50 to the drawer 90, the collar 572 is first guided toward the attachment position due to the contact of the collar 572 with the first guide surface 912, and, thereafter, the process cartridge 50 arrives at the attachment position as a result of the pivotal movement of the process cartridge 50 about the drum axis 51X. In this way, adjustment on the position of the process cartridge 50 in the first direction relative to the drawer 90 and adjustment on the angular position of the process cartridge 50 relative to the drawer 90 can be performed independently of each other. As such, easy attachment of the process cartridge 50 to the drawer 90 can be realized.

Further, in the process of attaching the process cartridge 50 to the drawer 90, the developing axis 53X is designed to arrive at its proper position by the pivotal movement of the process cartridge 50 about the drum axis 51X after the drum axis 51X is located at its proper position. In this way, positioning of the drum axis 51X and positioning of the developing axis 53X are performed independently of each other, thereby leading to facilitated attachment of the process cartridge 50 to the drawer 90.

Further, in the process of attaching the process cartridge 50 to the drawer 90, the recessed part 573 is inserted into the drawer 90 prior to the insertion of the flat surface part 571 into the drawer 90. With this configuration, the process cartridge 50 can be smoothly attached to the drawer 90.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

For example, the collar 572 of the above-described embodiment covers an entirety of the outer peripheral surface of the developing coupling 56. Alternatively, the collar 572 may cover at least a part of the outer peripheral surface of the developing coupling 56.

In the above-described embodiment, the position of the process cartridge 50 is fixed to the attachment position on the drawer 90 by the contact of the collar 572 with the second guide surface 913 and the third guide surface 914. However, positioning of the process cartridge 50 relative to the drawer 90 may be realized ultimately by other part or component of the drawer 90. For example, the ultimate position of the process cartridge 50 may be fixed by a positioning member which is provided on the fifth wall 95 of the drawer 90. In this case, the collar 572 may not contact the second guide surface 913 and the third guide surface 914.

Further, in the above-described embodiment, the drum axis 51X functions as the drum coupling axis. However, the drum coupling axis may be different from the drum axis 51X.

Further, in the above-described embodiment, the developing axis 53X functions as the developing coupling axis. However, the developing coupling axis may be different from the developing axis 53X.

Further, in the above-described embodiment, a color printer is employed as an example of an image forming apparatus according the disclosure. However, a monochromatic printer, and other types of image forming apparatus such as a copying machine, and a multi-function device may also be available as the image forming apparatus according to the disclosure.

Each part and component used in the embodiment and modifications may be suitably selected and combined together.

Remarks

The image forming apparatus 1 is an example of an image forming apparatus according to the disclosure. The housing 10 is an example of a housing of the image forming apparatus. The drawer 90 is an example of a drawer of the image forming apparatus. The process cartridge 50 is an example of a process cartridge of the image forming apparatus. The process housing 54 is an example of a process housing of the process cartridge. The photosensitive drum 51 is an example of a photosensitive drum of the process cartridge. The developing roller 53 is an example of a developing roller of the process cartridge. The locking member 62 is an example of a locking member of the process cartridge. The first rib 96, second rib 97, and third rib 98 are examples of a rib of the drawer. The first protrusion 961, second protrusion 971, and third protrusion 981 are examples of a first protrusion of the drawer. The first surface 961A, first surface 971A, and first surface 981A are examples of a first surface of the first protrusion. The second side cover 58 is an example of a side cover of the process cartridge. The third arcuate surface 581R is an example of an arcuate surface of the side cover. The memory 59 is an example of a memory of the side cover. The inner structure of the second side cover 58 corresponding to the sleeve part 574 is an example of a second protrusion of the side cover. The first arcuate surface E1 and second arcuate surface E3 are examples of another arcuate surface of the process cartridge. The first abutment surface F1 and third abutment surface F3 are examples of an abutment surface of the drawer. The drum coupling 55 is an example of a drum coupling of the process cartridge. The collar 572 is an example of a collar of the process cartridge. The notch RE is an example of a part of the drawer. The lever 61 is an example of a lever of the process cartridge. The first guide surface 912 is an example of a first guide surface of the drawer. The second guide surface 913 is an example of a second guide surface of the drawer. The first arcuate surface E1 and the second arcuate surface E3 are also examples of an arcuate surface of the process cartridge. The first abutment surface F1 and the third abutment surface F3 are examples of an abutment surface of the drawer. The first side cover 57 is another example of a side cover of the process cartridge. The sleeve part 574 is an example of a sleeve part of the side cover. The flat surface part 571 is an example of a flat surface part of the side cover. The recessed part 573 is an example of a recessed part of the side cover.

What is claimed is:

1. An image forming apparatus comprising:
a housing;
a drawer configured to be drawn out of the housing toward one side in a first direction, the drawer having one end at the one side in the first direction; and
a process cartridge attachable to the drawer, the process cartridge attached to the drawer being at an attachment position on the drawer, the process cartridge comprising:
a process housing;
a photosensitive drum rotatable about a drum axis extending in a second direction;
a developing roller rotatable about a developing axis extending in the second direction, the developing roller being movable between a contacting position where the developing roller is in contact with the photosensitive drum and a separated position where the developing roller is separated from the photosensitive drum; and
a locking member movable between a locking position where the locking member locks the developing roller at the separated position and an unlocking position where the locking member allows the developing roller to move from the separated position to the contacting position,
wherein the drawer has:
a first surface extending in the second direction, the first surface being positioned opposite the one end of the drawer in the first direction with respect to the process cartridge at the attachment position; and
a second surface positioned at an end of the first surface in the second direction to protrude upward therefrom, the second surface being configured to guide the process cartridge, and
wherein, in a state where the process cartridge is at the attachment position on the drawer,
the process cartridge is separated from the second surface in the first direction, and
the locking member is at the locking position.

2. The image forming apparatus according to claim 1,
wherein the process cartridge further comprises a side cover that supports the locking member, and
wherein the side cover opposes the second surface in the state where the process cartridge is at the attachment position on the drawer.

3. The image forming apparatus according to claim 2,
wherein the side cover has an arcuate surface configured to contact the second surface during the attachment of the process cartridge to the drawer.

4. The image forming apparatus according to claim 3,
wherein the process cartridge further comprises a memory configured to store information about the process cartridge, the memory being aligned with the arcuate surface in the first direction.

5. The image forming apparatus according to claim 4,
wherein the memory is aligned with the second surface in the first direction when the process cartridge is at the attachment position on the drawer.

6. The image forming apparatus according to claim 5,
wherein the memory is attached to the side cover.

7. The image forming apparatus according to claim 3,
wherein the process cartridge has another arcuate surface centered on the drum axis,
wherein the drawer has an abutment surface configured to abut on the another arcuate surface when the process cartridge is at the attachment position on the drawer, and
wherein, during the attachment of the process cartridge to the drawer, the another arcuate surface abuts on the abutment surface after the arcuate surface of the side cover contacts the second surface.

8. The image forming apparatus according to claim 2,
wherein the locking member is configured to contact the side cover in the first direction.

9. The image forming apparatus according to claim 8,
wherein the side cover has a second protrusion protruding toward an other side in the first direction, the second protrusion being configured to hold the locking member at the locking position.

10. The image forming apparatus according to claim 1,
wherein the process cartridge further comprises a lever extending in a third direction crossing the first direction and the second direction, the lever being configured to move the locking member from the locking position to the unlocking position, and
wherein, in a state where the drawer is attached to the housing with the process cartridge attached to the drawer, the lever urges the locking member to move the locking member from the locking position to the unlocking position.

11. The image forming apparatus according to claim 1,
wherein a plurality of the process cartridges is attachable to the drawer, and
wherein the plurality of the process cartridges is arrayed with one another in the first direction in a state where the plurality of the process cartridges is attached to the drawer.

12. The image forming apparatus according to claim 1,
wherein, in the state where the process cartridge is at the attachment position on the drawer,
the second surface is positioned upward relative to both the drum axis and the developing axis.

13. The image forming apparatus according to claim 1,
wherein, in the state where the process cartridge is at the attachment position on the drawer,
the developing axis is positioned between the drum axis and the second surface in the first direction.

14. The image forming apparatus according to claim 1,
wherein, in the state where the process cartridge is at the attachment position on the drawer, a gap in the first direction between the second surface and the process housing is smaller than a gap in the first direction between a lower end of the first surface and the process housing.

15. The image forming apparatus according to claim 1, wherein, in the state where the process cartridge is at the attachment position on the drawer, a gap in the first direction between an upper end of the first surface and the process housing is smaller than a gap in the first direction between a lower end of the first surface and the process housing.

* * * * *